Sept. 11, 1928. 1,684,080
O. ZERK, NOW BY JUDICIAL CHANGE OF NAME O. U. ZERK
AUTOMATIC GREASE GUN AND THE LIKE
Original Filed July 5, 1923
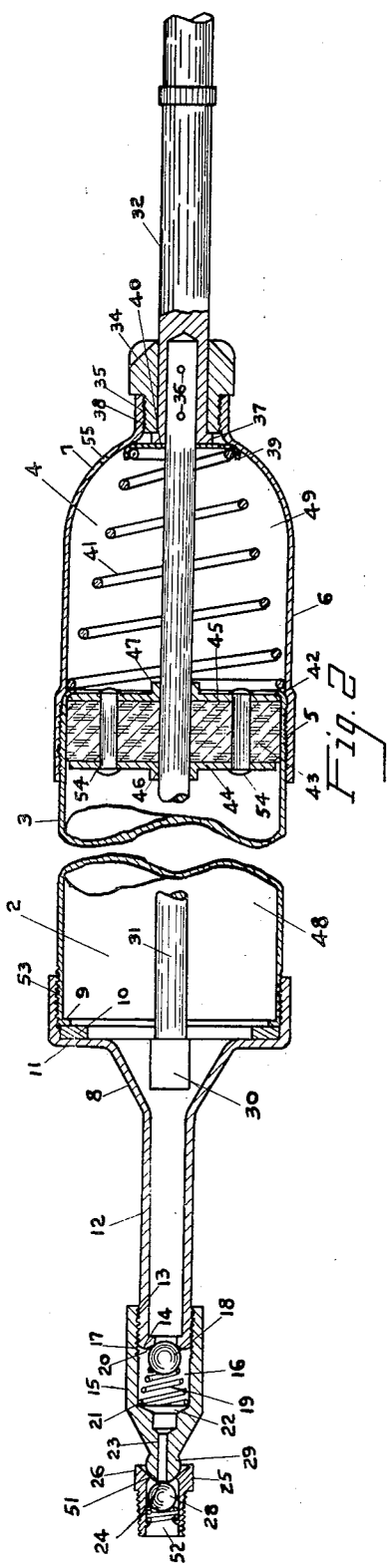
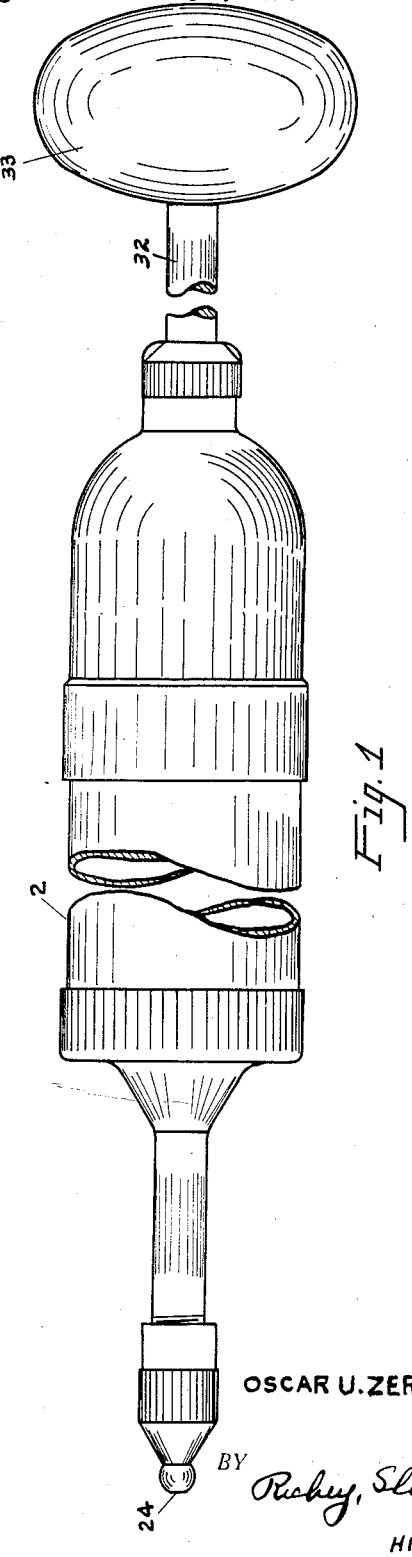
OSCAR U. ZERK *INVENTOR.*
BY *Richey, Slough & Watts*
*HIS ATTORNEYS*

Patented Sept. 11, 1928.

1,684,080

UNITED STATES PATENT OFFICE.

OSCAR ZERK, OF CHICAGO, ILLINOIS, NOW BY JUDICIAL CHANGE OF NAME OSCAR ULYSSES ZERK, ASSIGNOR, BY MESNE ASSIGNMENTS, TO THE BASSICK MANUFACTURING COMPANY.

AUTOMATIC GREASE GUN AND THE LIKE.

Application filed July 5, 1923, Serial No. 649,702. Renewed March 12, 1928.

My invention relates to automatic grease guns and more particularly to that type of grease gun which is employed to dispense a lubricant such as grease or oil from a barrel or other lubricant containing reservoir into lubricant receiving nipples, which have an interior passageway communicating with the machine bearings to be lubricated.

It is an object of this invention to produce a unitary structure comprising a reservoir, a discharge nozzle, and lubricant pressure generating means, which may be rapidly applied to lubricate one or a number of lubricant receiving nipples such as are installed for lubricating the different bearings of an automobile or other machine.

It is a further object of this invention to provide a grease gun which is simple in construction, extremely efficient in operation and which will dispense lubricant at a very high pressure into a lubricant receiving nipple at the expenditure of a minimum amount of manual power applied to the gun at the time of dispensing the lubricant. Other objects of my invention and the invention itself will be better understood by reference to the drawings, in which an embodiment of my invention is illustrated.

Referring now to the drawings,—

Fig. 1 shows a side elevational view of a grease gun embodying my invention.

Fig. 2 shows a longitudinal medial sectional view of the grease gun of Fig. 1, certain parts thereof being shown in elevation.

Referring now to the drawings, I show a grease gun barrel 2 comprising a cylinder 3 and an end cap 4 threaded on said cylinder at 5 and comprising a forward cylindrical portion 6 and a rearwardly rounded portion 7. At 8 I show a combined end cap and nozzle, threaded onto the forward end of the barrel 2 as shown at 53, there being provided an inwardly extending flange 9 for the end of the barrel and a gasket 10 being interposed between said flange and an adjacent portion 11 of the member 8. This gasket is preferably of cork or like material and prevents the loss of lubricant from the interior of the barrel to the exterior thereof through the threaded joint 53. The cap 8 has an axially extended tubular portion 12 forming the nozzle of the gun, the tubular portion 12 being externally threaded at 13 adjacent the end of the tubular portion and having an inwardly extending flange at the end, as shown at 14. A connector 15 having a substantially cylindrical chamber 16 is provided, and has an end portion 17, screw threaded onto the screw threaded portion 13 of the tube 12. A ball 18 is pressed by a spring 19 against a circular seat 20 provided at the orifice at the end of the tube 12 by the inwardly extending flange 14 thereof. The spring and ball are disposed in the chamber 16, the spring 19 being preferably substantially frusto-conical in outline, the different turns thereof from the ball forwardly being of successively larger diameter and the largest turn seating at 21 against the end wall 22 of the chamber.

A passageway 23 is provided from the chamber 16 through the end of the connector 15, the passageway 23 terminating at an orifice 24 on the extreme end of the connector, said orifice being preferably axial with the tube 12 and the gun barrel 2. The connector end may be variously formed but I may form it as shown in Fig. 2 wherein the connector end terminates in a tip 29 which is shaped like a portion of a sphere, such portion being preferably greater than half of a sphere, the passageway 23 extending axially thereof. In such a case the nipple 25 will be formed with a flaring contact face 26 in its end wall, said flaring contact face being centrally apertured to provide an orifice through which lubricant may pass from the passageway 23 of the gun connector 15, when such connector is pressed against the flared face of the nipple and the lubricant within the gun subjected to pressure. At such time the lubricant will pass through the passageway 23 and the orifice 24 of the gun and into the nipple past the ball 28, which normally closes the passageway from the flared face 26 to the interior of the nipple.

The tube 12 constitutes a cylinder into which a piston 30 may be reciprocated, said piston 30 being carried on the end of a piston rod 31 axially disposed within the gun barrel 2 and is rigidly connected to a handle rod 32 leading to a handle 33, said handle 33 being disposed outside of the gun barrel, the handle rod and piston rod being rigidly connected together and axially disposed with reference to the barrel and sliding through an axial opening in the end wall 7 of the cover 4. A bushing 34 is screw threaded as shown at 35 in the end wall opening. The handle rod 32, which is rigidly secured onto the end of the piston rod 31 as by rivets 36, has an outwardly extending flange 37 on its inner end to seat against the inner end 38 of the bushing 34; a dished washer 39 is loosely placed over the piston rod 31 and pressed against the end wall 40 of the flanged handle rod 32 by a spring 41, said spring being a compression spring comprising turns of gradually increasing diameter, the smallest end turn being disposed within the dished washer 39 and embraced thereby, and the largest turn being seated against an inwardly extending flange 42 on the end of the cylindrical barrel 3. This flange serves as a seat for the spring 41 whereby the spring 41 will normally retract the piston rod 31 and integrally secured handle rod 32 and maintain it in the position of Fig. 2. A main piston of considerably larger diameter than the piston 30 is positioned within the barrel cylinder 3 and comprises a cork piston portion 43 and clamping washers 44 and 45. These washers tightly clamp the cork piston 43 by being riveted together by rivets 54 extending through the washers and interposed cork. The washers and cork have axially aligned openings through which the piston rod 31 for the piston 30 extends, the rod 31 and main piston being relatively reciprocable. The axial opening through the washers 44 and 45 has its bearing face for the rod 31 increased by annular flanges 46 and 47. The main piston is slidable in the barrel 3 and on the rod 31. The main piston herein described is in the nature of a movable wall between the lubricant containing chamber 48 and the chamber 49 within the cover member 6. This movable wall, as it is moved toward the nozzle end of the gun barrel, decreases the size of the chamber 48 and correspondingly increases the size of the chamber 49. The chamber 49 is not air tight, the connections being fitted so that air may enter the chamber 49 as the main or large piston is moved forwardly toward the nozzle end of the gun, and be expressed from such chamber when the direction of movement of the main piston is reversed; the operation of the grease gun of Figs. 1 and 2 is as follows:—

Assuming that the lubricant receiving nipple 25 is secured to the frame contiguous to the main bearings and with the passageway to the nipple leading through the bearing surfaces to be lubricated, the spherical shaped end of the gun is brought into contact with the flared face 26 of the nipple which constitutes a guide and the operator will exert a forward pressure on the handle 33 towards such nipple. This will move the piston rod 31 and the piston 30 into the tube 12. When the gun is first put into use the tube 12 is preferably charged by filling it with grease prior to securing it onto the end of the gun barrel.

The projection of the piston 30 into the tube 12 and forwardly through such tube will cause the lubricant in the tube to be trapped and it will be ejected upon continued forward pressure exerted by the operator, as described, through the valve 18—20 in opposition to the power of the spring 19, which is overcome, and through the passageway 23, the orifice 24 of such passage way, and through the orifice 27 of the nipple and the passage way 51 of the nipple leading to the bearing surfaces to be lubricated. The ball 28 of the nipple valve will be displaced by such operation and the manual pressure exerted axially of the gun will maintain a leak proof joint between the spherical surface of the spherical end 50 of the nozzle and the circular edge 51 of the nipple orifices, capable of withstanding, the very high hydraulic pressures set up by the operation of the gun just described.

When the forward thrust is withdrawn, or sufficiently decreased, the spring 41 will return the piston to the position of Figure 2. The spring 41 provided for this purpose is strong enough to withdraw the piston 30 against the power of the partial vacuum created within the tube 12, between the piston 30 and the check valve 18. When the piston 30 has moved entirely out of the cylindrical portion 12 of the member 8 and enters the flared mouth portion of such member, lubricant will be drawn into the tube 12 to replace the lubricant which has just been ejected. The lubricant thus displaced from the chamber 48 of the barrel 2 and entering the tube 12 to recharge the same will cause in turn a movement of the main piston 43 forwardly of the cylinder 2, which piston will prevent the formation of an air column or the entrance of any air into the barrel 2 of the gun. The forward movement of the piston 43 is automatic as distinguished from the forward movement of pistons in lubricant dispensing guns hitherto known in the art wherein the forward movement is accomplished directly by manual pressure applied to such pistons, or by the power of a spring bearing against such a piston, the spring being previously distorted by manual power. In a gun as just described, I find that the movable piston 43 comprises a movable wall as before stated between the chambers 48 and 49 and I find that it follows the grease or other lubricant contained in the chamber 48 so closely that substantially no air enters the chamber and that a continuous efficient operation of the gun can be secured every time that the piston 30 is reciprocated without irregular intermittent action as if air were included with the grease in such a gun, and that the gun may be operated successively to eject substantially equal amounts of lubricant such as grease at each operation, and that the main piston will follow such grease, preventing air from entering the space to the rear thereof or throughout the grease until practically all of the grease contained in the chamber 48 has been fed forwardly by so-called "section action" into the high pressure cylinder 12 and ejected therefrom.

Having described as above the operation of one embodiment of my invention I wish to point out particularly that I have herein provided a lubricant dispensing apparatus comprising a lubricant reservoir having a movable wall one side of which is maintained substantially at atmospheric pressure by virture of openings 55 through the casing on such side of the wall and a discharge conduit leading from the reservoir on the other side of the wall together with means to displace the lubricant from such conduit and to subsequently close the discharge end of such conduit prior to the withdrawal of the lubricant displacing means, which, in the embodiment illustrated, comprises a plunger piston, such operation resulting in a considerable reduction of fluid pressure within the said conduit, which reduced pressure is distributed to all portions of the reservoir whereby a difference of pressure will be exerted on the two sides of such movable wall, the movable wall therefore being pressed toward the discharge conduit by the excess of atmospheric pressure on its side which communicates with the atmosphere.

Having thus described my invention in a preferred embodiment I wish it to be understood that I am aware that numerous and extensive departures may be made from the embodiments herein illustrated and described but without departing from the spirit of my invention.

What I claim is:—

1. A lubricant compressor comprising a lubricant containing barrel having a discharge conduit at one end, a detachable cap at the other end of said barrel, a central plunger extending through said cap and barrel for forcing the contents of said barrel out of said exit, a spring housed entirely in said cap for returning said plunger, the edge of said barrel being turned in to form an abutment for said spring, said spring comprising helical coils of decreasing diameter so that it can be compressed to a flat spiral, an annular follower in said barrel, said discharge conduit being detachably connected with said barrel.

2. A lubricant compressor comprising a barrel, a discharge conduit communicating with one end of said barrel and having an inwardly closing check valve therein, said discharge conduit being detachable from said barrel to permit refilling of said barrel, a plunger reciprocably mounted in said barrel and comprising means for ejecting lubricant through said discharge conduit, an annular piston surrounding said plunger, and means for preventing said piston from being withdrawn from said barrel.

3. A lubricant compressor comprising a lubricant containing barrel having a discharge conduit at one end, a detachable cap at the other end of said barrel, a plunger extending through said cap and barrel for forcing the contents of said barrel out of said discharge conduit, an annular follower in said barrel, means on said plunger to engage said follower and draw it to the rear of said barrel while refilling said barrel in front of said follower, and stop means limiting the rearward movement of said follower.

4. A lubricant compressor comprising a lubricant containing barrel having a discharge conduit at one end, a cap at the other end of said barrel, a central plunger extending through said cap and barrel for forcing the contents of said barrel out of said discharge conduit, a spring housed in said cap for returning said plunger, an annular follower in said barrel, said barrel having a turned-in flange at its rear end forming an abutment for said spring and a stop for said follower.

5. A lubricant compressor comprising a lubricant containing barrel having a discharge conduit at one end, a cap at the other end of said barrel, a central plunger extending through said cap and barrel for forcing the contents of said barrel out of said discharge conduit, a spring housed in said cap for returning said plunger, an annular follower in said barrel, said barrel having a turned-in flange at its rear end forming an abutment for said spring and a stop for said follower, said discharge conduit being removable to permit filling said barrel.

In testimony whereof I hereunto affix my signature this 3rd day of July, 1923.

OSCAR ZERK.